Jan. 29, 1957       F. C. TRAGER       2,779,663
RECOVERY OF THIONYL CHLORIDE
Filed Nov. 3, 1951
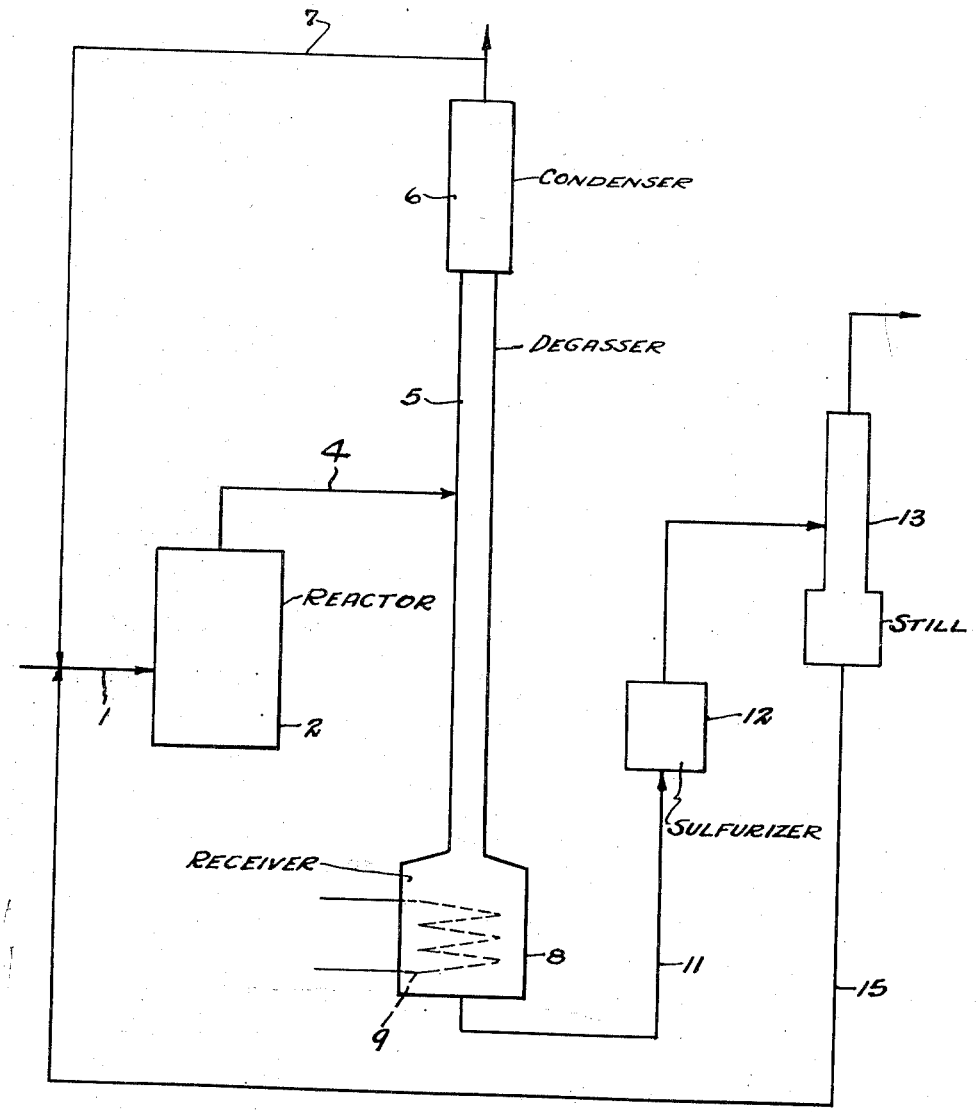
INVENTOR.
FRED C. TRAGER
BY
Oscar L. Spencer
ATTORNEY.

United States Patent Office 2,779,663
Patented Jan. 29, 1957

2,779,663

RECOVERY OF THIONYL CHLORIDE

Fred C. Trager, Akron, Ohio, assignor to Columbia-Southern Chemical Corporation, Allegheny County, Pa., a corporation of Delaware Application November 3, 1951, Serial No. 254,750

5 Claims. (Cl. 23—203)

This invention relates to a method of recovering thionyl chloride, $SOCl_2$, from a gaseous mixture containing thionyl chloride, sulfur dioxide, and chlorine. It has particular relation to the recovery of thionyl chloride from a gaseous mixture containing thionyl chloride, sulfur dioxide, and chlorine, such as is produced in the reaction of a sulfur chloride with sulfur dioxide and chlorine in the presence of a catalyst at an elevated temperature.

It is known that thionyl chloride may be prepared by reacting a sulfur chloride with sulfur dioxide and chlorine, presumably according to one of the following equations:

(1) $S_2Cl_2 + 2SO_2 + 3Cl_2 = 4SOCl_2$
(2) $SCl_2 + SO_2 + Cl_2 = 2SOCl_2$

The reactants are contacted in the presence of a catalyst, preferably activated carbon, and conditions are controlled so that the temperature in the reaction zone is at least high enough to prevent formation of sulfuryl chloride ($SO_2Cl_2$). Appreciable conversion of the sulfur chloride takes place at temperatures between 150° C. and 400° C. These temperatures do not define critical limits beyond which no conversion takes place; however, lower or higher temperatures of reaction do not facilitate significant yields. The temperature of reaction should be maintained above 100° C. to prevent formation of $SO_2Cl_2$. This method of producing thionyl chloride is more fully described in U. S. Patent No. 2,431,823 granted to Alphonse Pechukas.

In the method of producing thionyl chloride described in U. S. Patent No. 2,431,823, the reaction mixture comprising $SO_2$, $Cl_2$, $SCl_2$, $S_2Cl_2$, and $SOCl_2$ leaves the reactor in the gaseous phase at a temperature near the temperature of reaction, usually around 200° C., and is then passed through a condenser which reduces the temperature of the mixture to about 25° C., thereby condensing the product, thionyl chloride. The condensate contains $SO_2$ and $Cl_2$ dissolved in the solution. Also present in the condensate is a small amount of sulfuryl chloride.

The condensate is then transported to a degasser in which $SO_2$ and $Cl_2$ are driven off as gases. The liquid residue, after removal of $SO_2$ and $Cl_2$, is topped to remove a fraction containing principally sulfur dichloride which can be recycled to the feed. However, the product still contains a small amount of sulfuryl chloride which is very difficult to remove. The sulfuryl chloride cannot be effectively removed by distillation from thionyl chloride due to the proximity of their boiling points. It is desired to have a method of recovering thionyl chloride from a gaseous mixture of thionyl chloride, sulfur dioxide, and chlorine which recovers thionyl chloride substantially free from sulfuryl chloride.

In accordance with this invention, such a method of recovering thionyl chloride from a gaseous mixture of thionyl chloride, sulfur dioxide, and chlorine has been provided. This method comprises cooling the gaseous mixture to a temperature below the boiling point of thionyl chloride and removing gases, including $SO_2$ and $Cl_2$, from the resulting liquid $SOCl_2$ while the temperature of the liquid remains above 70° C. At such temperature, thionyl chloride is in the liquid state and sulfur dioxide and chlorine are in the gaseous state. These gaseous agents may be removed conveniently by passing gaseous thionyl chloride through or in contact with the liquid thionyl chloride. The low content of sulphuryl chloride which is present in the liquid thionyl chloride thus obtained is believed to be due to the fact that the gaseous reaction products are removed from the thionyl chloride so rapidly that formation of sulfuryl chloride therein is substantially minimized.

In accordance with a further embodiment of the invention, thionyl chloride is removed from a gaseous mixture containing thionyl chloride, sulfur dioxide, and chlorine by introducing the gaseous mixture into a degasser which is maintained at certain conditions. The degasser consists of a column packed with suitable rings or discs made of refractory materials to provide a greater surface area within the column and improved contact between an upwardly flowing gaseous stream of thionyl chloride, emanating from a still fitted to the bottom of the column below the point of entry of the gaseous mixture, and a downwardly flowing liquid stream of thionyl chloride descending from a condenser connected to the top of the column above the point of entry of the gaseous mixture.

The gaseous mixture of reaction products described above enters the degasser at a point somewhere between the top and bottom of the column, usually in the central portion of the column. This mixture rises to the top of the column, with the stream of gaseous thionyl chloride rising from the still, to the condenser where thionyl chloride is condensed to a liquid and begins to descend in the column. The remainder of the gaseous mixture passes through the condenser to be recycled or disposed of.

The temperature within the column is maintained very close to the boiling point of thionyl chloride. This is accomplished by virtue of the fact that the still at the bottom of the column, wherein liquid thionyl chloride is collected, is continuously vaporizing a portion of this liquid to cause it to rise in the column, and the condenser at the top of the column is continuously condensing thionyl chloride to cause it to descend in the column. The rate of heating in the still and cooling in the condenser is regulated to keep a proper flow of gaseous and liquid thionyl chloride in the column.

The degasser may alternatively consist of a single column in which heat is supplied at the bottom of the column and taken off at the top of the column by a suitable condensing means. Other arrangements for construction of the degassing column may be employed by those skilled in the art without departing from the purview of the invention.

The invention may be described with reference to the accompanying drawing which illustrates a preferred embodiment of the invention as practiced with a method of producing thionyl chloride such as described above.

As shown in the drawing, a heated gaseous mixture of chlorine, sulfur dioxide, and a sulfur chloride are introduced through line 1 to a reactor 2 which contains a hot charcoal bed. The temperature of the reactor is maintained at about 200° C. by conventional heating means (not shown).

After passing through the reactor, the reaction products, comprising a gaseous mixture containing thionyl chloride, sulfur dioxide, chlorine, and any unreacted sulfur mono- or di-chloride at a temperature of about 200° C., are transported through a heated line 4 to a degasser 5. The gaseous mixture coming from the reactor is maintained at a temperature of about 200° C. during its passage through line 4, and enters the degasser at a temperature near 200° C.

The degasser 5 consists of a tall column packed with Berl saddles or other suitable refractory packing and fitted with a reflux condenser 6 at the top of the column and a receiver 8 partially filled with boiling thionyl chloride at the bottom of the column. The degasser may be constructed of glass or stainless steel or other suitable material.

The vapors of thionyl chloride created in the receiver 8, which is heated by a suitable heating means 9, rise in the degasser 5 and join with the gaseous mixture to ascend to the condenser 6 in which thionyl chloride is condensed. The heat exchange in the condenser is regulated so that all of the thionyl chloride in the gaseous mixture is condensed but is not reduced more than a few degrees in temperature below the boiling point of thionyl chloride. The remaining gases, constituting mainly sulfur dioxide and chlorine, pass off through the condenser and may be recycled through line 7 to reactor 2. The condensate descends in the degasser 5, countercurrently to the ascending gaseous thionyl chloride, to the receiver 8 to be revaporized or removed to storage or further purification.

The thionyl chloride which is removed from the receiver 8 is transported through line 11 to a sulfurizer 12 in which any remaining sulfur dichloride is converted to higher boiling sulfur monochloride from which thionyl chloride can be easily removed by distillation in a still 13. The distillate from the still 13 is pure thionyl chloride. The residue from the still is sulfur monochloride which may be recycled by means of line 15 to the reactor 2.

The following example illustrates a typical operation of the invention with respect to the flow sheet in the drawing. Over a period of 4 hours, sulfur monochloride (191 grams), sulfur dioxide (185 grams), and chlorine (209 grams) were passed through an activated carbon catalyst kept at 225° C. in a reactor 2. The gases from the reactor 2 were passed through a heated glass line 4 into about the middle of a degasser 5. The degasser 5 was a glass tube one inch in inside diameter by 24 inches in length, packed with ¼ inch Berl saddles. The degasser was fitted with a reflux condenser 6 at the top, and a 500-cubic centimeter round-bottom flask 8, partially filled with boiling thionyl chloride, at the bottom.

At the end of 4 hours, the condensate collected in the flask 8 was removed to a sulfurizer 12 and subsequently distilled in a distillation column 13 from which was obtained 217 grams of thionyl chloride containing 0.36 percent by weight of sulfuryl chloride.

The degasser 5 may be operated at subatmospheric or superatmospheric pressures as well as at atmospheric pressure. In any event, the temperature which is maintained in the degasser 5 will closely approximate the boiling temperature of thionyl chloride at the pressure employed, usually being at the boiling temperature of thionyl chloride or at a temperature which is not more than 10 degrees centigrade below the boiling temperature of thionyl chloride.

The temperature of the gaseous mixture coming from the reactor 2 and entering the degasser 5 has been described as being at about 200° C. Maintaining the temperature of the gaseous reaction mixture at 200° C., as it enters the degasser, has been found to give highly desirable results. However, the temperature of the gaseous mixture upon entry to the degasser may be at other temperatures above the boiling point of thionyl chloride, for example, at a temperature between 100 and 400° C.

Although the present invention has been described with reference to certain details of specific embodiments, it is not intended that such details shall be regarded as a limitation upon the scope of the invention except insofar as included in the accompanying claims.

What is claimed:

1. A method of recovering thionyl chloride from a gaseous mixture containing thionyl chloride, sulfur dioxide, and chlorine, the temperature of said mixture being in excess of 100° C., which comprises bringing the gaseous mixture into contact with an upwardly flowing stream of gaseous thionyl chloride, which stream is in contact with a countercurrently flowing stream of liquid thionyl chloride, condensing thionyl chloride from the gaseous mixture above the point of contact of said gaseous mixture with the countercurrently flowing streams of thionyl chloride, collecting a pool of liquid thionyl chloride below said point of contact, vaporizing a portion of the pool of thionyl chloride and supplying the resulting gaseous thionyl chloride to the upwardly flowing stream, and removing liquid thionyl chloride from said pool while maintaining the thionyl chloride at a temperature above 70° C. until it is withdrawn from the pool.

2. A method of recovering thionyl chloride from a gaseous mixture containing thionyl chloride, chlorine, and sulfur dioxide, which comprises introducing said mixture, at a temperature above 100° C., into an intermediate point in a column, flowing gaseous thionyl chloride up the column from below the point where the mixture is introduced, condensing thionyl chloride in the upper portion of the column, allowing condensed thionyl chloride to flow down the column countercurrently to the upwardly rising thionyl chloride, and maintaining the temperature of the condensed thionyl chloride above about 70° C. until it is withdrawn from the bottom of the column.

3. A method of recovering thionyl chloride from a gaseous mixture produced by reacting a sulfur chloride with sulfur dioxide and chlorine in the presence of a catalyst at a temperature above 100° C. to produce a gaseous mixture containing thionyl chloride, sulfur dioxide, and chlorine, which comprises bringing the gaseous mixture into contact with an upwardly flowing stream of gaseous thionyl chloride, which stream is in contact with a countercurrently flowing stream of liquid thionyl chloride, condensing thionyl chloride from the gaseous mixture above the point of contact of said gaseous mixture with the countercurrently flowing streams of thionyl chloride, collecting liquid thionyl chloride below said point of contact, vaporizing a portion of the collected thionyl chloride to supply an upwardly flowing stream of gaseous thionyl chloride, and recovering the remaining liquid thionyl chloride and maintaining the liquid thionyl chloride at a temperature above 70° C. until soluble gases have been removed therefrom.

4. A method of recovering thionyl chloride from a hot gaseous mixture of thionyl chloride, chlorine, and sulphur dioxide, which comprises cooling the mixture to condense thionyl chloride and thereby producing liquid thionyl chloride which contains chlorine and sulphur dioxide dissolved therein, holding the condensed thionyl chloride above 70° C., passing gaseous thionyl chloride through said liquid thionyl chloride, and continuing said passage of said gaseous thionyl chloride through said liquid thionyl chloride until the dissolved chlorine and sulphur dioxide have been substantially completely removed while maintaining the temperature of said liquid thionyl chloride above 70° C.

5. A method of recovering thionyl chloride from a hot gaseous mixture containing thionyl chloride, chlorine, and sulphur dioxide, which comprises cooling the mixture to condense thionyl chloride, stripping the dissolved chlorine and sulphur dioxide from the thionyl chloride by passing gaseous thionyl chloride therethrough before the thionyl chloride is allowed to cool below 70° C., and continuing such passage until the chlorine and sulphur dioxide have been substantially completely removed.

References Cited in the file of this patent

UNITED STATES PATENTS

| | | |
|---|---|---|
| 1,861,900 | Beanblossom | June 7, 1932 |
| 2,059,494 | Shires | Nov. 3, 1936 |
| 2,362,057 | Edwards | Nov. 7, 1944 |
| 2,415,921 | Wagner | Feb. 18, 1947 |
| 2,420,623 | Salzenberg et al. | May 13, 1947 |
| 2,431,823 | Pechukas | Dec. 2, 1947 |
| 2,432,405 | Gerhold | Dec. 9, 1947 |
| 2,434,923 | Hachmuth | Jan. 27, 1948 |
| 2,529,671 | Bissinger | Nov. 14, 1950 |
| 2,539,679 | Trager | Jan. 30, 1951 |